Sept. 25, 1928.                    A. O. JAEGER                    1,685,672
                              CATALYTIC APPARATUS
                           Filed Oct. 27, 1926        4 Sheets-Sheet 1
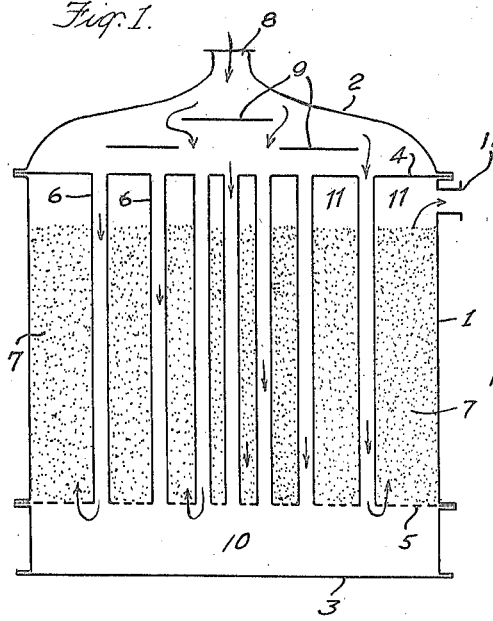
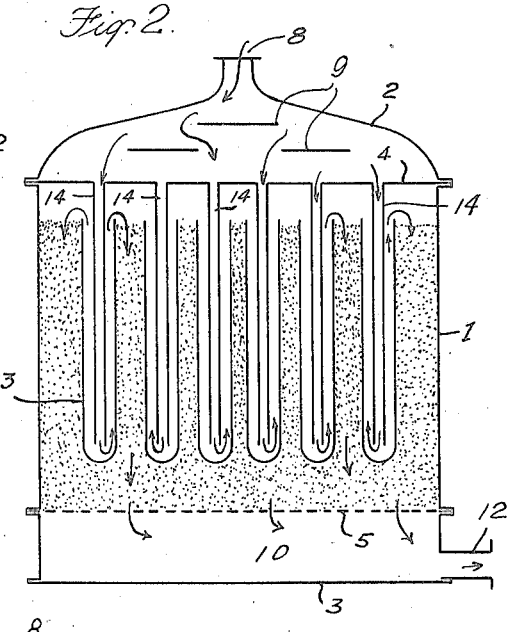
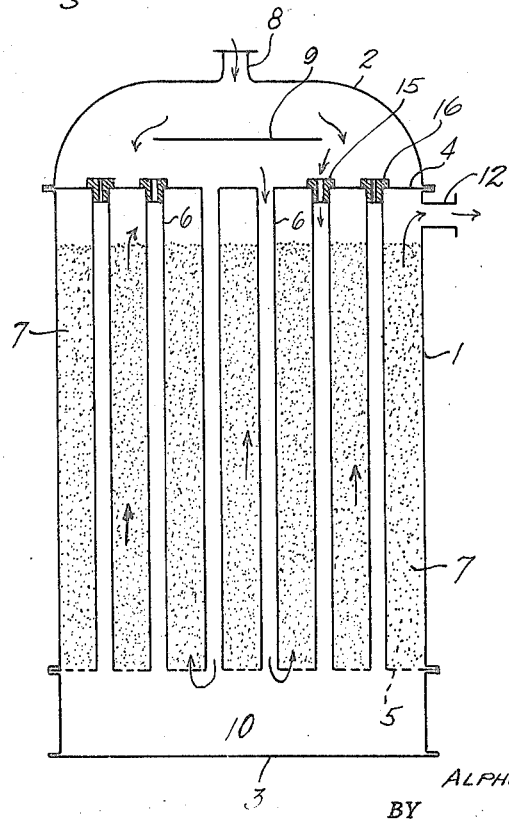
INVENTOR
ALPHONS O. JAEGER
BY Newell & Spencer
ATTORNEYS

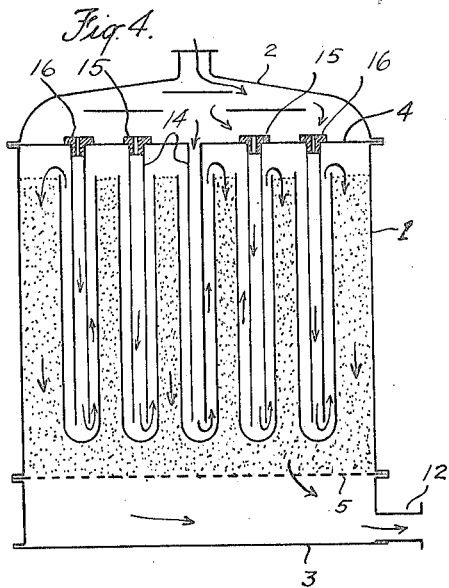
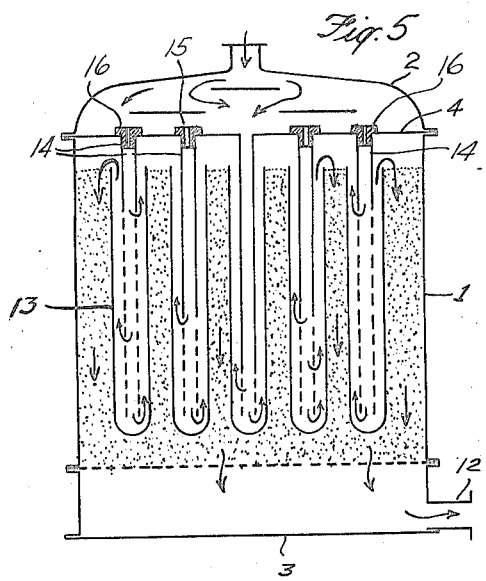
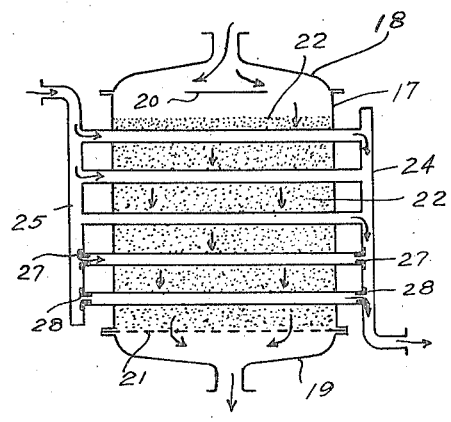
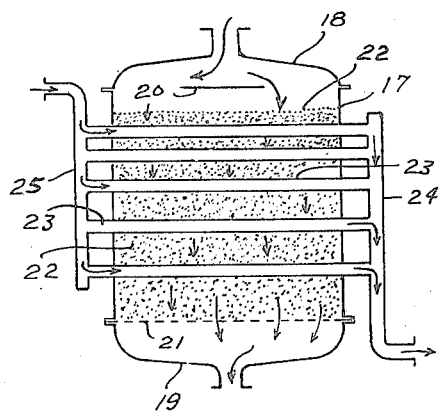

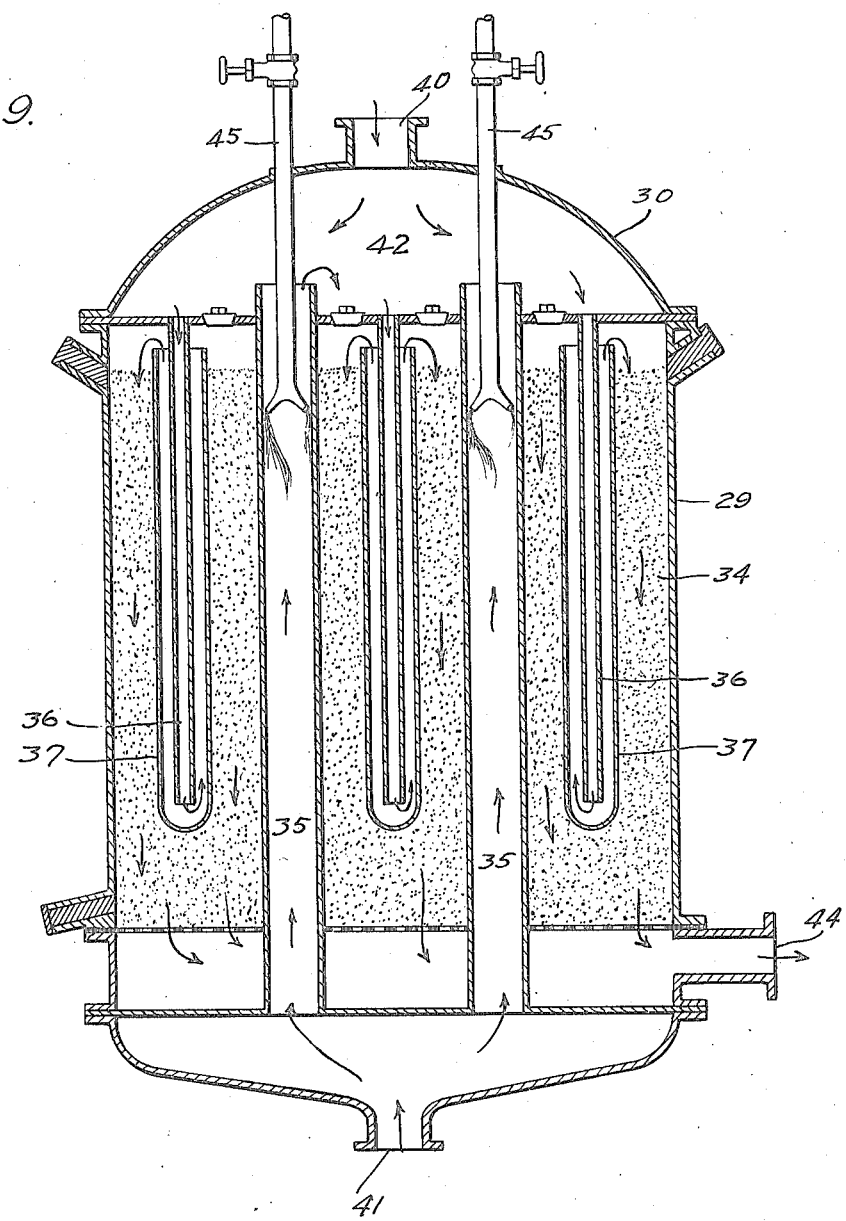

Patented Sept. 25, 1928.

1,685,672

UNITED STATES PATENT OFFICE.

ALPHONS O. JAEGER, OF PITTSBURGH, PENNSYLVANIA, ASSIGNOR TO THE SELDEN COMPANY, OF PITTSBURGH, PENNSYLVANIA, A CORPORATION OF DELAWARE.

CATALYTIC APPARATUS.

Application filed October 27, 1926. Serial No. 144,496.

This invention relates to catalytic apparatus and particularly to catalytic apparatus for use in exothermic vapor phase catalytic reactions.

The problem of cooling the catalyst in converters is a serious one when the reaction carried out is strongly exothermic. Tubular converters in which the catalyst is placed in small tubes have proved to be satisfactory for many exothermic reactions. However, this type of converter is open to a number of disadvantages from the standpoint of structure and operation. Thus, for example, it is frequently difficult to adjust the resistance of the various tubes and uneven gas flows and other undesirable actions result. Tray or layer converters such as for example the Grillo sulfuric acid converter and others in which the catalyst is present in relatively large layers, present many advantages from the standpoint of even gas flow and cheapness of construction. It is, however, very difficult to cool the catalyst in such converters evenly and uniformly when the apparatus is used in exothermic reactions. Horizontal layers of catalyst are comparatively easily cooled at their periphery, but tend to become hot in the central zones.

It has been proposed to operate a modified tubular converter in which the catalyst is not in the tubes, but surrounds them, and cooling liquids or cooling gases are circulated through the tubes. It is possible by this method to retain many of the advantages of a layer type converter and at the same time to bring about sufficient cooling. It is, however, not possible in the ordinary construction with uniform tube placement to effect uniform cooling, since the peripheral zones which are cooled not only by the circulating tubes, but also by the converter shell itself are over-cooled if the cooling is sufficient to keep the central portion from overheating and, on the contrary, if the cooling is adjusted to be correct for the peripheral zones, the central zones are under-cooled. In many catalytic reactions, it is just as important to prevent under-cooling as over-cooling and the aim should always be to bring about a uniform temperature. This is particularly true in reversible reactions in which the equilibrium depends very largely on the temperature and is also true in the case of reactions which tend to produce undesired side reactions when the optimum temperature range is either exceeded or not reached. This condition frequently arises in the oxidation of organic compounds such as, for example, aromatic compounds where undesired by-products are frequently produced when the reaction temperatures are not maintained uniform throughout the catalyst mass.

In the co-pending application of Jaeger and Bertsch, Serial No. 100,818, filed April 9, 1926, and my prior application, Serial No. 124,569, filed July 24, 1926, I have described converters having modified shapes of cooling tubes. These converters show a remarkably increased efficiency of cooling, but are open to the same objection of non-uniformity of cooling unless the cooling elements are arranged as described in the present invention.

I have found that a perfectly uniform cooling of catalysts can be effected with any suitable type of cooling tubes or with any combination of types of cooling tubes by proportioning either the number of the tubes, their peripheries, the gas velocities passing therethrough or the gas temperatures, so that the central zones of the catalyst are cooled more strongly than the peripheral zones. This results in a uniform temperature throughout the catalyst mass since the peripheral zones, as has been pointed out above, receive additional cooling from the external converter shell.

The provision of increased cooling effect in the center of the catalyst which is the object of the present invention does not depend primarily upon any definite heat conductivity of the catalyst itself. In general, catalysts are poor heat conductors partly because the substances used are themselves poor conductors of heat and largely because the catalyst layer is formed of granules which touch only at a few points. The extent to which it is necessary to increase the cooling of the central portions of the catalysts will depend, of course, on the heat transfer characteristics of the catalyst and it may be desirable to intersperse metallic bodies with the catalysts either in the form of granules, metal shavings, chips, wire mesh or other forms in order to increase the heat conductivity of the catalyst layer as a whole. It should be clearly understood that the use of such aids is not in itself new and is claimed in the present invention only in combination with the cooling element arrangement which forms the subject matter of the present invention. Incidentally, it may be pointed out that the addition of bodies of high heat conductivity to the catalyst layer is a palliative only since the metallic granules, meshes, or other bodies do not touch each other over great surfaces and accordingly are subjected to the same heat transfer disadvantages which are present in the catalyst layer itself.

The structural arrangement and design of the cooling elements may be varied and any suitable arrangement may be used. In the drawings, a few illustrative examples will be used but it is to be understood that the invention is in no sense to be limited thereto. Similarly, only a few of the modifications of cooling element design described in the prior applications to myself and of Jaeger and Bertsch referred to above are shown but any of the modifications which are described and claimed in these applications may be utilized in conjunction of the element arrangement of the present invention.

The invention will be illustrated in greater detail in connection with the drawings in which a few typical modifications of the presend invention are shown. The drawings are purely diagrammatic in nature and are reduced to the essentials of the converter structure. In any given installation, of course, the various accessories and structural details which are well known to converter engineers may be used but since they form no part of the present invention specific structural features are for the most part omitted from the drawings, in which Figure 1 is a section through a tube-cooled converter provided with plain tubes;

Figure 2 is a section through a converter having double travel cooling elements;

Figure 3 is a vertical section through a straight tube converter provided with tubes having varying gas velocities;

Figures 4 and 5 are sections through double travel tubular converters having similar means for varying the gas speed through the cooling tubes;

Figures 6 and 7 illustrate layer or tray type converters with horizontal cooling tubes, Figure 6 showing non-uniformly spaced plain tubes and Figure 7 showing uniformly arranged tubes for varying gas velocities; and Figures 8 and 9 are sections through tubular converters provided with series gas flow through the cooling elements and accessory spray cooling.

Figure 8:
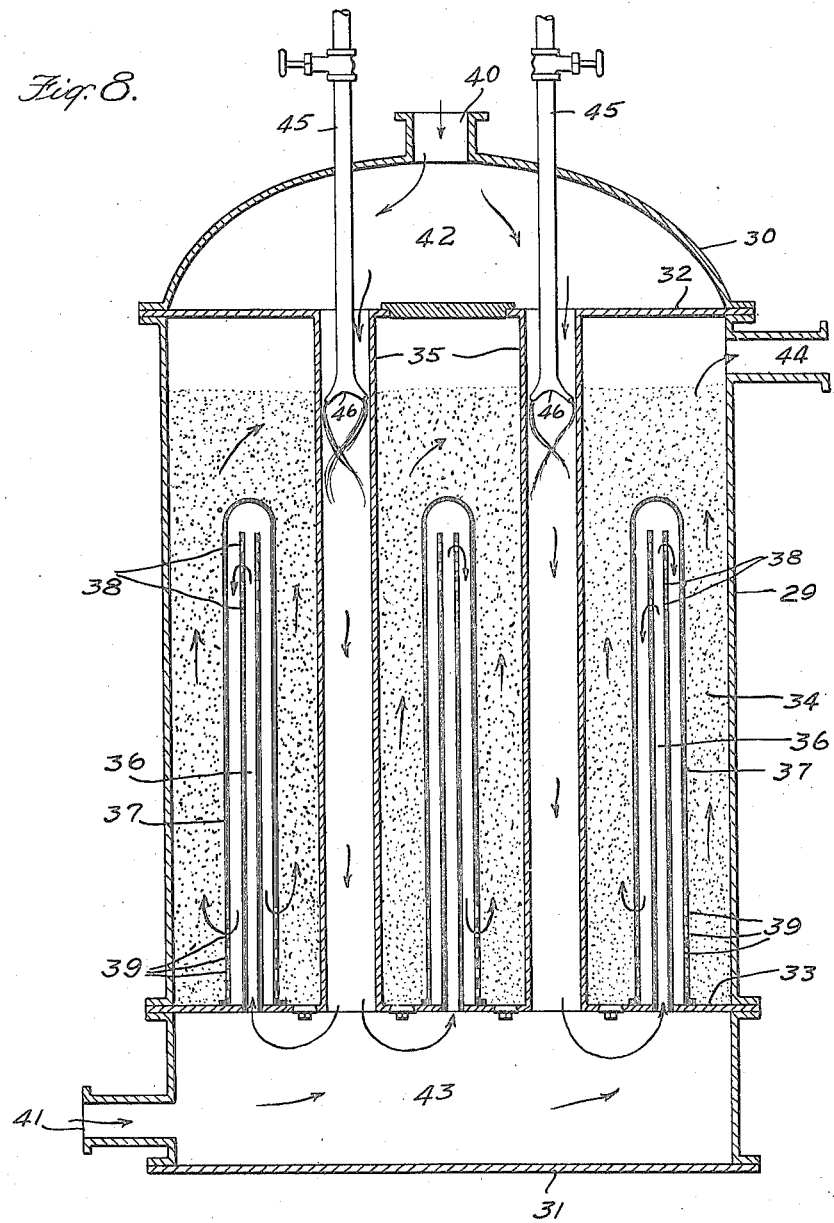

In Figure 1 the converter is shown as formed of a cylindrical shell 1, a top piece 2 and bottom plate 3. A partition 4 extends for the full width of the converter at the upper end of the cylindrical shell and a perforated partition 5 is arranged at a lower portion of the shell. Straight cooling tubes 6 pass through both partitions and are surrounded with catalyst as shown at 7. Reaction gases enter the top piece at 8, are distributed by means of baffles 9 and pass downwardly through the cooling elements 6 into a space 10 formed by the bottom plate 3, the shell 1 and the perforated partition 5. From this space the gases pass upwardly through the perforated partition and through the catalyst into a space 11 which is formed between the upper surfaces of the catalyst and the upper partition 4. The reacted gases then pass out through an opening 12 in the shell 1.

It will be noted that the cooling tubes are arranged much closer together at the center than at the periphery and the thickness of the slices of the catalyst between the cooling tubes increases rapidly from the center toward the periphery. The placement must, of course, be chosen to effect uniform cooling for any particular reaction and in general will vary with different reactions which evolve different quantities of heat and which necessitate catalysts of varying conductivities.

It will be apparent that the cold reaction gases are heated by passing through the cooling elements to a substantially uniform temperature and at the same time the catalyst is uniformly cooled, resulting in the constant maintenance of an optimum temperature throughout the whole of the catalyst layer. A plurality of reacting gases may be introduced instead of one reacting gas and if desired, different reacting gases may pass through different tubes. In general, throughout the figures, only a single reaction gas or mixture of reaction gases are shown but it should be understood that a plurality of reaction gases may be introduced at the same or different portions of the converter.

In Figure 2 a converter of the type illustrated in the application of Jaeger and Bertsch above referred to is shown. The arrangement is similar to that in Figure 1 but instead of single tubes 6 passing from the upper partition 4 through the lower partition 5, double tube elements are provided consisting in closed tubes 13 embedded in the catalyst and open tubes 14 extending downwardly from the partition 4. The gases passing in through the opening 8 and being mixed by the baffles 9 pass down through the tubes 14 to the bottom of the tubes 13, thence upwardly through the annular space between the tubes 13 and 14 and downwardly through the catalyst into chamber 10 and out the exit pipe 12.

Since the cooling tubes in the central portion of the catalyst are arranged closer together than in the peripheral portions, the cooling effect decreases from the center toward the periphery and when the spacing has been adequately adjusted for the particular reaction which is to be carried out a perfectly uniform cooling is effected.

The converters shown in Figures 1 and 2 operate very satisfactorily when the spacing of the elements is properly arranged with respect to the heat transfer capacity of the catalyst to the nature of the reaction taking place and also to the speed of flow of the gases through the converter which in turn determines the amount of heat evolved and also affects to a certain extent the heat distribution, since an increased gas flow within the limits of complete reaction results in a corresponding increase in the heat evolved which, however, is partially neutralized, as far as the tubes go, by a substantially equal increase in the amount of cooling gases passing through them. There is no change in the radiation from the converter shell and accordingly the relative effect of the converter shell cooling is different at high gas velocities from that at low gas velocities. There is also a difference in the cooling effect in the tubes since at higher gas velocities the gas may not be heated up to quite as high a temperature. Once built therefore converters such as those illustrated in Figures 1 and 2 and similarly converters such as are shown in Figure 6 which will be described later on, are designed for full efficiency only with a definite catalyst and with a definite reaction speed.

It is possible to obtain satisfactory regulation and at increased flexibility by varying the proportion of gases flowing through the different cooling elements even though the latter are uniformly placed. This is illustrated in Figures 3, 4 and 5 in which the tubes 6 and inner tubes 14 respectively are provided with plugs 15 and 16 of different opening sizes whereas no plugs are used on the central tube. In the case of Figure 5 only one size of plug is used but an additional compensating effect is provided as will be described.

In Figures 3 and 4, therefore, a greater amount of gas flows through the central tubes 6 and 14 than through the intermediate tubes which, in turn, have a greater flow than the peripheral tubes. Obviously, of course, more than two sizes of plug openings will be used as in the ordinary converter there are usually a larger number of cooling elements than shown in the diagrammatic drawings which, for the sake of simplicity have been restricted to a relatively small number of cooling elements. The central elements are, therefore, cooled much more intensely than are the peripheral elements and when the relative gas flow has been properly adjusted a perfectly uniform cooling results. This method of controlling cooling has the advantage that it can be adapted to varying gas flows and varying reactions by using different sized plugs without rebuilding the converter. In Figure 5, an addition to the provision of plugs 15 and 16 in the tubes 14, these latter are of varying effective lengths. As illustrated in the drawing the length variation is effected by perforating the lower portions of the tubes 14 to different pipes which brings about the same result as if the tubes were shortened. The latter expedient can, of course, also be used, but is not as desirable as a sudden line of demarcation between the cooled and uncooled portions of the tubes 13 is thereby produced which is undesirable in most cases. The perforations perform the same function of reducing the effective length of the tubes but some gas is permitted to flow down to the bottom of the tubes 13 so that there is no sharp line of demarcation between the cooled and uncooled portions.

Figures 6 and 7 illustrate converters with horizontal tubes and separate cooling gases. The converters consist of shell 17, top piece 18, bottom piece 19, baffle 20, perforated partition 21 and catalyst layer 22. Horizontal cooling tubes 23 pass through the catalyst and the converter shell and connect cooling gas mains 24 and 25. Reaction gases enter through an opening 25 in the top piece 18 and after passing through the catalyst pass out through an opening 26 in the bottom piece 19.

In Figure 6 the cooling tubes are arranged asymmetrically, that is to say, they are more closely spaced in the upper portion of the catalyst layer than in the lower portion with the result that in the upper portion which comes in contact with the fresh reaction gases and accordingly produces the most violent reaction with the evolution of the greatest amount of heat, the cooling is at a maximum. The converter shell can be rectangular or cylindrical and the distribution of tubes should be such as to provide for a uniform cooling in each zone of the catalyst.

Instead of spacing the tubes asymmetrically the amount and velocity of gases passing through the tubes may be varied. This construction is shown in Figure 7 where plugs 27 and 28 are provided in the lower tubes in order to restrict the amount of cooling gases which pass through these tubes. Of course, a combination of spacing and varying gas velocities may also be used and in many cases may prove desirable.

The cooling gas used in Figures 6 and 7 may be air or any other available gas or the reaction gases may first be passed through the cooling tubes and then into the converter, thus effecting cooling simultaneously with the warming up of the reaction gases. Liquids and vapors may also be used. Combinations of there two methods may also be utilized. Cooling gas may also be passed in series through the various tubes first through those in the hottest zone. This has the advantage that the lower portions of the catalyst zone in which the reaction proceeds very slowly by reason of the fact that the reaction gases are diluted with the reaction product, require little or no cooling and may in some cases actually require heating. Instead of straight tubes, spiral tubes may be used in the various zones and other modifications of placement of cooling tubes in order to bring about uniform cooling may be utilized.

In the preceding figures for the most part the cooling has been effected by cooling gases but this is not the only method which can be used. Where one or more of the reaction components are liquids or solids at normal temperatures and must be vaporized or where inert vapors may be present in the reaction gases, the latent heat of vaporization of the liquids may be utilized to cool the cooling tubes in the center of the catalyst. In Figure 8 a converter is shown consisting in a shell 29, upper piece 30, bottom plate 31, partitions 32 and 33 and catalyst 34 between the partitions. Tubes 35 extend through both partitions at a point intermediate between the periphery and the center of the catalyst mass, whereas inverted double tubes 36 and 37 lead from the lower partition 33 up into the catalyst. These double tubes are preferably provided with suitable perforations 38 and 39, the latter leading into the catalyst.

Gas inlet mains 40 and 41 enter into upper chambers 42 and 43 respectively and a gas exit main 44 above the catalyst layer and below the partition 32 serves to remove the products of reaction. Spray pipes 45 with spray nozzles 46 extend downwardly through the top piece 30 into the tubes 35. In operation reaction gases enter through the mains 40 and if necessary 41, the gas from the main 40 passing downwardly through the tubes 35 and joining the gases from the main 41 in the chamber 43, whence the gases pass upwardly through the tubes 36 and downwardly through the tubes 37 in heat exchanging contact with the catalyst, thereby cooling it, the gases being themselves warmed up. On reaching the bottom of the tubes 37, they pass out through perforations into the catalyst rising therethrough and pass out through the main 44 as indicated by the arrows. Inverted double tubes 36 and 37 may be considered the primary cooling elements and the tubes 35 as the secondary cooling elements. These latter, which are all within a relatively short distance of the central portions of the catalyst, are also cooled by spraying solids or liquids through the nozzle 46 onto the walls of the tubes where they pass downwardly in the form of a film in contact with the hot catalyst and are vaporized or are melted, the latent heat of vaporization or fusion being utilized to provide the additional cooling required in the central portion of the catalyst. In some reactions, instead of utilizing liquid or solid reacting components, inert liquids, such as, for example water, may be sprayed from the nozzles 46 and effect cooling and at the same time dilution of the reaction gases which, for many purposes, is desirable in order to moderate the activity of the reaction, the relatively high specific heat of steam being also a notable factor in the cooling effect of the primary cooling tubes 36 and 37.

Figure 9 illustrates a similar arrangement except that the converter shell with its partitions is arranged upside down so that the primary cooling tubes extend downwardly into the catalyst. The operation is the same as in Figure 8 except that the liquids or solids introduced through the nozzles 46 pass in counter current to the upward gases flowing through the tubes 35 and are therefore maintained in contact with the walls of the tubes 35 until they are completely vaporized which is desirable where a considerable amount of liquid is used, as it obviates the possibility of unvaporized liquid passing downwardly into the chamber 43, an always present danger in the arrangement shown in Figure 8.

Other and further modifications of primary and secondary cooling either by gases or by evaporation may be utilized and are desirable in many cases. The invention is not limited to particular structures and on the contrary, a number of different modifications may be used wherever they prove advantageous.

I claim—

1. Catalytic apparatus comprising a layer type converter, a catalyst layer therein, heat exchanging elements embedded in said catalyst having such a non-uniform relative spacing, dimensioning, design and heat exchanging capacity as to produce a substantially uniform cooling throughout any horizontal cross-section of the catalyst layer.

2. Catalytic apparatus comprising a layer type converter, a catalyst layer therein, cooling tubes embedded in said catalyst and having such a non-uniform relative spacing, dimensioning, design or heat exchanging capacity as to produce a substantially uniform cooling throughout any horizontal cross-section of the catalyst layer, said cooling tubes consisting in closed end outer tubes embedded in the catalyst and open end inner tubes extending therein, and deflecting means for causing the gases issuing from the outer tubes to pass downwardly through the catalyst.

3. Apparatus according to claim 1, in which the central cooling elements are more closely spaced than the peripheral elements.

4. Apparatus according to claim 1, in which means are provided for circulating cooling gases through the cooling elements with varying velocities, the velocities decreasing from the central elements toward the peripheral elements.

5. Apparatus according to claim 1, in which means are provided for circulating cooling gases through the cooling elements with varying velocities, the velocities decreasing from the central elements toward the peripheral elements, said velocity variations being effected by varying the intake cross-section of the cooling elements.

6. Apparatus according to claim 2, in which the effective length of the inner tubes is decreased from the central tubes toward the peripheral tubes.

7. Catalytic apparatus comprising in combination a layer type converter, a catalyst layer therein, primary gas-cooled tubes distributed therethrough, secondary cooling tubes in the central portion of said catalyst layer, and means for passing reaction gases and a vaporizable substance through said secondary tubes in such a manner as to effect vaporization of said substances.

8. Apparatus according to claim 7, in which the circulation of reaction gases and vaporizable substance through the secondary tubes is in counter current.

9. Apparatus according to claim 7, in which the primary cooling elements consist in closed end tubes embedded in the catalyst, and open end tubes extending therein, means being provided for circulating gases through the open end tubes into the closed end tubes and reversing their flow therein.

Signed at Pittsburgh, Pa., this 25th day of October, 1926.

ALPHONS O. JAEGER.